(12) United States Patent
Phu et al.

(10) Patent No.: US 12,020,732 B2
(45) Date of Patent: Jun. 25, 2024

(54) GIMBAL DESIGN WITH INCREASED DIMPLE CONTACT FORCE

(71) Applicant: Magnecomp Corporation, Murrieta, CA (US)

(72) Inventors: Johnathan Hy-Tho Phu, San Gabriel, CA (US); Treesoon Kotchaplayuk, Wangnoi (TH); Rakkiet Warinsirirux, Wangnoi (TH); Thanapat Chaivarakij, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 17/970,516

(22) Filed: Oct. 20, 2022

(65) Prior Publication Data
US 2023/0128010 A1 Apr. 27, 2023

Related U.S. Application Data

(60) Provisional application No. 63/271,959, filed on Oct. 26, 2021.

(51) Int. Cl.
*G11B 5/48* (2006.01)
(52) U.S. Cl.
CPC .......... *G11B 5/4826* (2013.01); *G11B 5/4833* (2013.01)
(58) Field of Classification Search
None
See application file for complete search history.

(56) References Cited

U.S. PATENT DOCUMENTS

| 7,330,338 | B1 | 2/2008 | Wick et al. | |
| 7,667,930 | B1 * | 2/2010 | Wang | G11B 5/4826 360/245.3 |
| 8,456,776 | B1 * | 6/2013 | Pan | G11B 5/6088 360/59 |
| 8,488,281 | B1 * | 7/2013 | Pan | G11B 5/4826 360/245.9 |
| 8,861,143 | B2 * | 10/2014 | Hong | G11B 5/483 360/245 |
| 9,047,896 | B1 | 6/2015 | Kudo et al. | |
| 9,159,343 | B2 | 10/2015 | McCaslin et al. | |
| 9,830,938 | B1 * | 11/2017 | Aoki | G11B 5/4833 |

(Continued)

OTHER PUBLICATIONS

International Search Report and Written Opinion in International Application No. PCT/US2022/047475, dated Feb. 13, 2023.

*Primary Examiner* — William J Klimowicz
(74) *Attorney, Agent, or Firm* — DLA Piper LLP (US)

(57) ABSTRACT

A trace gimbal is described herein. In some embodiments, the trace gimbal includes outer struts including a front outrigger at a distal end of the trace gimbal and a rear outrigger at a proximal end of the trace gimbal. The front outrigger includes a distal front outrigger and a proximal front outrigger. The rear outrigger includes a distal rear outrigger and a proximal rear outrigger. A middle strut extends in a width direction of the trace gimbal, adjoining the proximal front outrigger to the rear outrigger, and connecting to a slider tongue. The front outrigger includes a strut form bent away from a load beam reference plane at an angle θ. In some embodiments, the outer struts include a second strut form disposed on the rear outrigger. The second strut form can be bent toward the load beam reference plane at the angle θ.

19 Claims, 4 Drawing Sheets

(56) References Cited

U.S. PATENT DOCUMENTS

| | | | |
|---|---|---|---|
| 11,043,236 B1 | 6/2021 | Pallay | |
| 2002/0154448 A1* | 10/2002 | Kasajima | G11B 5/4853 |
| | | | 360/245.3 |
| 2007/0086115 A1* | 4/2007 | Harris | G11B 5/4826 |
| 2007/0223143 A1* | 9/2007 | Matsui | G11B 5/486 |
| | | | 360/245.1 |
| 2021/0280209 A1* | 9/2021 | Suzuki | G11B 5/4846 |
| 2022/0310116 A1* | 9/2022 | Ee | G11B 5/4826 |
| 2023/0117866 A1* | 4/2023 | Nishida | G11B 5/4833 |
| | | | 29/603.03 |

* cited by examiner

| | Strut Form#1 (deg.) | Strut Form#2 (deg.) | PSA (deg.) | DCF (gf) | GT1 Freq. (Hz) | GT1 Gain (dB) | GT1 Phase (deg.) |
|---|---|---|---|---|---|---|---|
| No Form | - | - | 1.85 | 0.240 | 10859 | 1.284 | -8.04 |
| Baseline (Strut form#1) | -3.26 | - | 2.47 | 0.285 | 10844 | 1.356 | -9.95 |
| Strut Form#2 | - | 3.72 | 2.31 | 0.359 | 10898 | 1.008 | -5.15 |
| Strut Form#1 and #2 | -3.26 | 3.72 | 2.39 | 0.420 | 10880 | 0.935 | -4.37 |

*FIG. 4*

GIMBAL DESIGN WITH INCREASED DIMPLE CONTACT FORCE

CROSS-REFERENCE TO RELATED APPLICATIONS

This application claims the benefit of, and priority to, U.S. Provisional Application No. 63/271,959 filed on Oct. 26, 2021, which is hereby incorporated by reference in its entirety.

FIELD

This disclosure relates to the field of suspensions for hard disk drives. More particularly, this disclosure relates to the field of trace gimbals for a hard disk drive suspension.

BACKGROUND

In a hard disk drive storage device, a rotating disk is employed to store information. Hard disk drives typically include a frame to provide attachment points and orientation for other components, and a spindle motor mounted to the frame for rotating the disk. A read/write head is formed on a head slider for writing and reading data to and from the disk surface. The head slider is supported and properly oriented in relationship to the disk by a suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the suspension, thus positioning the head slider at a desired height and alignment above the disk which is referred to as the fly height.

Suspensions for disk drives include a load beam and a trace gimbal. The load beam typically includes a mounting region for mounting the suspension to an actuator of the hard disk drive, a rigid region, and a spring region between the mounting region and the rigid region. The spring region provides a spring force to counteract the aerodynamic lift force generated on the head slider during the drive operation as described above. The trace gimbal typically includes a gimbal region having a slider mounting surface where the head slider is mounted. The gimbal region is resiliently moveable with respect to the remainder of the trace gimbal in response to the aerodynamic forces generated by the air bearing. The gimbal region permits the head slider to move in pitch and roll directions and to follow disk surface fluctuations.

Hard disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track.

SUMMARY

A trace gimbal having improved dimple contact force is described herein. According to some embodiments of the present disclosure, the trace gimbal includes outer struts including a front outrigger at a distal end of the trace gimbal and a rear outrigger at a proximal end of the trace gimbal. The front outrigger includes a distal front outrigger and a proximal front outrigger. The rear outrigger includes a distal rear outrigger and a proximal rear outrigger. A middle strut extends in a width direction of the trace gimbal, adjoining the proximal front outrigger to the rear outrigger, and connecting to a slider tongue. The front outrigger includes a strut form bent away from a load beam reference plane at an angle θ. In some embodiments, the outer struts include a second strut form disposed on the rear outrigger. The second strut form can be bent toward the load beam reference plane at the angle θ.

In some embodiments, the trace gimbal includes at least one microactuator mounted on the slider tongue, wherein the middle strut supports the slider tongue.

In some embodiments, the strut form on the front outrigger is bent away from the load beam reference plane at an angle θ from about 1.0 to 8.0 degrees.

In some embodiments, the strut form on the rear outrigger is bent away from the load beam reference plane at an angle θ from about 2.0 to 7.0 degrees.

In some embodiments, the strut form is disposed on the proximal front outrigger.

In some embodiments, the outer struts include a second strut form disposed on the rear outrigger.

In some embodiments, the second strut form is disposed on the proximal rear outrigger.

In some embodiments, the second strut form is bent toward the load beam reference plane at an angle θ from about 1.0 to 8.0 degrees.

In some embodiments, the second strut form is bent toward the load beam reference plane at an angle θ from about 2.0 to 7.0 degrees.

In some embodiments, a first end of the middle strut adjoins the front outrigger and the rear outrigger, a second end of the middle strut connects the middle strut to the slider tongue, and the middle strut forms a U-shape between the first and second ends of the middle strut.

A suspension comprising the trace gimbal according to some embodiments of the present disclosure is also provided.

In some embodiments, the suspension includes at least one microactuator mounted on the slider tongue, wherein the middle strut supports the slider tongue.

In some embodiments, the strut form on the front outrigger is bent away from the load beam reference plane at an angle θ from about 1.0 to 8.0 degrees.

In some embodiments, the strut form on the front outrigger is bent away from the load beam reference plane at an angle θ from about 2.0 to 7.0 degrees.

In some embodiments, the strut form is disposed on the proximal front outrigger.

In some embodiments, the outer struts include a second strut form disposed on the rear outrigger.

In some embodiments, the second strut form is disposed on the proximal rear outrigger.

In some embodiments, the second strut form is bent toward the load beam reference plane at an angle θ from about 1.0 to 8.0 degrees.

In some embodiments, the second strut form is bent toward the load beam reference plane at an angle θ from about 2.0 to 7.0 degrees.

In some embodiments, a first end of the middle strut adjoins the front outrigger and the rear outrigger, a second end of the middle strut connects the middle strut to the slider tongue, and the middle strut forms a U-shape between the first and second ends of the middle strut.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

FIG. 4 illustrates a comparison of the pitch static attitude (PSA), dimple contact force, first gimbal torsion mode (GT1) frequency, GT1 gain, and GT1 phase for a gimbal having no strut forms, a gimbal having a first strut form, a gimbal having a second strut form, and a gimbal having both the first and second strut forms.

DETAILED DESCRIPTION

Figure 1:
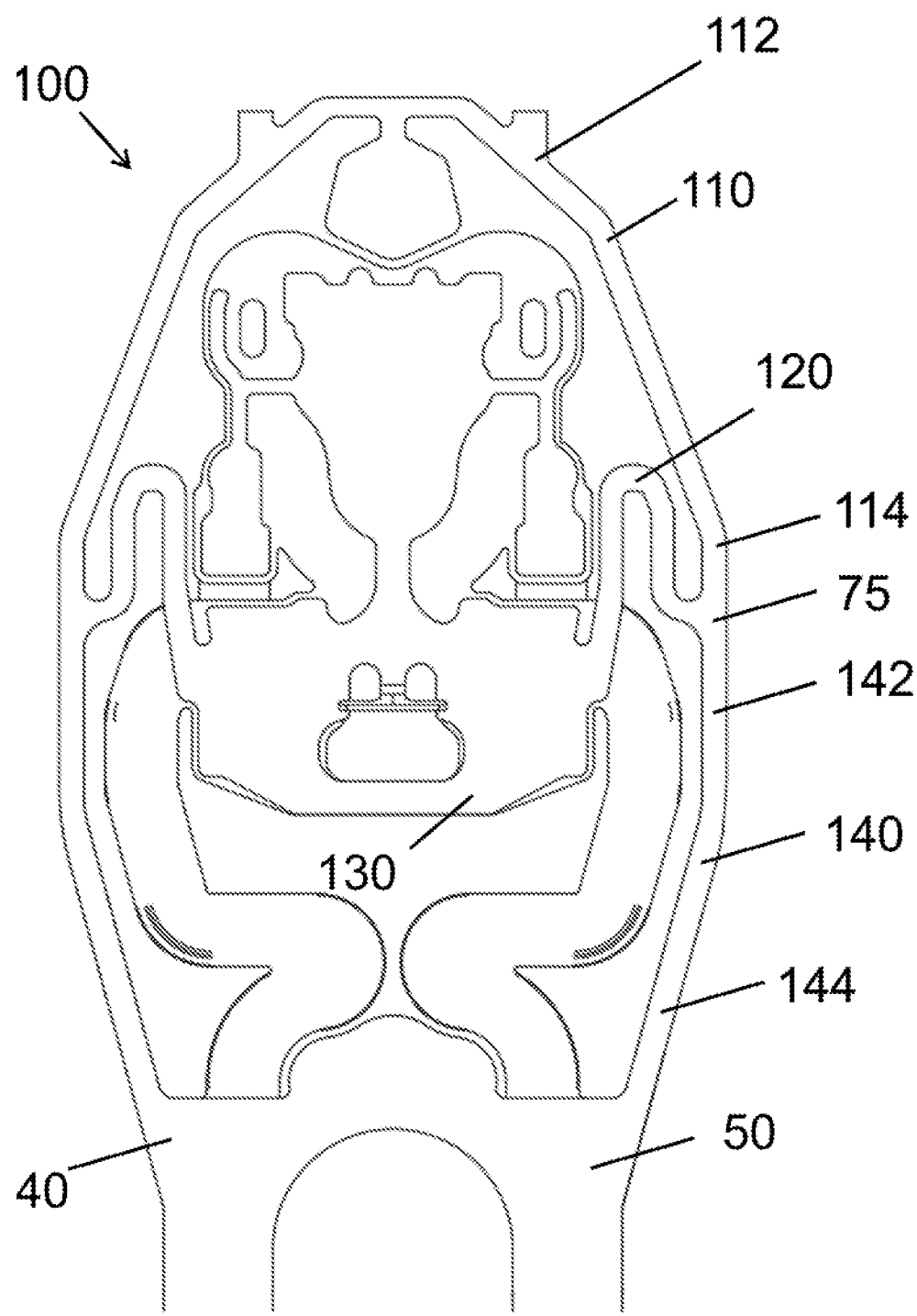
FIG. 1 illustrates a trace gimbal of a suspension, according to some embodiments of the present disclosure.

An improved trace gimbal is described herein. The improved trace gimbal according to some embodiments of the present disclosure is part of suspension for a hard disk drive unit. The disk drive unit includes a spinning magnetic disk, which contains a pattern of magnetic ones and zeroes on it that constitutes the data stored on the disk drive. The hard disk drive is driven by a drive motor. The disk drive unit, according to some embodiments, includes a suspension with a load beam, a base plate, and a trace gimbal including a gimbal region to which a head slider, such as a magnetic head slider, is mounted proximate the distal end of the trace gimbal. The proximal end of a suspension or load beam is the end that is supported, i.e., the end nearest to a base plate which is swaged or otherwise mounted to an actuator arm. The distal end of a suspension or load beam is the end that is opposite the proximal end, i.e., the distal end is the cantilevered end. Proximal and distal, as used herein, refers to the relative direction along the longitudinal axis of the suspension while lateral refers to the left and/or right directions orthogonal to the longitudinal axis of the suspension.

The trace gimbal is coupled to a base plate, which in turn is coupled to a voice coil motor. The voice coil motor is configured to move the suspension arcuately in order to position the head slider over the correct data track on the disk. The head slider is carried on the trace gimbal, which allows the slider to pitch and roll so that it follows the proper data track on the spinning disk, allowing for such variations without degraded performance. Such variations typically include vibrations of the disk, inertial events such as bumping, and irregularities in the disk's surface.

In some embodiments, the trace gimbal described herein is part of a dual-stage actuation (DSA) suspension or a tri-stage actuation suspension. The suspension can include a base plate and a load beam. The load beam includes a trace gimbal. The trace gimbal can include one or more mounted actuators and a gimbal assembly. The actuators are operable to act directly on the gimbaled assembly of the suspension that is configured to include the read/write head slider.

In some embodiments, the trace gimbal can include at least one actuator joint configured to receive an actuator. The trace gimbal, according to some embodiments, includes two actuator joints, located on opposing sides of a gimbal of a trace gimbal. Each actuator joint includes actuator mounting shelves.

In some embodiments, each actuator spans the respective gap in the actuator joint. The actuators are affixed to the slider tongue by an adhesive. The adhesive can include conductive or non-conductive epoxy strategically applied at each end of the actuators. The positive and negative electrical connections can be made from the actuators to a trace gimbal by a variety of techniques. When the actuator is activated, it expands or contracts producing movements of the read/write head that is mounted at the distal end of suspension thereby changing the length of the gap between the mounting ends.

In some embodiments, the suspension can be configured as a single-stage actuation suspension, a dual-stage actuation device, a tri-stage actuation device or other configurations. In some embodiments, the tri-stage actuation suspension includes actuators respectively located at the mount plate region and on the trace gimbal at the same time. Conceivably, any variation of actuators can be incorporated onto the suspension for the purposes of the examples disclosed herein. In other words, the suspension may include more or less components than those shown without departing from the scope of the present disclosure. The components shown, however, are sufficient to disclose an illustrative example for practicing the disclosed principles.

FIG. 1 illustrates a trace gimbal 100 of a suspension, according to some embodiments of the present disclosure. The trace gimbal 100 includes at least one microactuator mounted on a slider tongue 130. The trace gimbal 100 includes a stainless-steel layer 40. It will be understood that the stainless-steel layer 40 could alternatively be formed from another metal or rigid material.

The trace gimbal 100 includes outer gimbal struts. The outer gimbal struts include a front outrigger 110 at a distal end of the trace gimbal 100. In some embodiments, the front outrigger 110 includes a proximal front outrigger 114 and a distal front outrigger 112. In some embodiments, the distal front outrigger 112 and the proximal front outrigger 114 are defined by a bend or non-linear feature of the front outrigger 110. In some embodiments, the distal front outrigger 112 and the proximal front outrigger 114 are non-distinguishable, and may be adjoined at a linear feature that does not physically separate the two features.

In some embodiments, the outer gimbal struts also include a rear outrigger 140 at a proximal end of the trace gimbal 100. In some embodiments, the rear outrigger 140 extends from a base portion 50 of the stainless-steel layer 40 of the trace gimbal. In some embodiments, the rear outrigger 140 includes a proximal rear outrigger 144 and a distal rear outrigger 142. In some embodiments, the proximal rear outrigger 144 extends from the base portion 50 of the stainless-steel layer of the trace gimbal 100. In some embodiments, a length direction of the trace gimbal 100 is defined as the direction extending from the proximal end and distal end of the trace gimbal 100.

In some embodiments, the distal rear outrigger 142 and the proximal rear outrigger 144 are defined by a bend or non-linear feature of the rear outrigger 140. In some embodiments, the rear outrigger 140 is a linear feature. In some embodiments, the distal rear outrigger 142 and the proximal rear outrigger 144 are non-distinguishable, and may be adjoined at a linear feature that does not physically separate the two features.

In some embodiments, the trace gimbal 100 also includes a middle strut 120 connecting the front outrigger 110 to the rear outrigger 140 at corner 75 and generally in a width direction of the trace gimbal 100 (essentially in a direction orthogonal to the longitudinal axis of the trace gimbal 100 for some embodiments). In other words, the front outrigger 110 and the rear outrigger 140 adjoin at a first end of the middle strut 120 (i.e., at corner 75). In some embodiments, a second end of the middle strut 120 connects the middle strut 120 to the slider tongue 130. The middle strut 120 supports the slider tongue 130 onto which a read/write head is assembled. In some embodiments, the middle strut 120 generally forms a C-shape or U-shape between the first and second ends of the middle strut 120. In some embodiments, middle strut 120 generally forms a U-shape. In some embodiments, the pair of middle struts 120 is the part that connects or otherwise supports the slider tongue 130 between the outer struts.

Figure 2A:
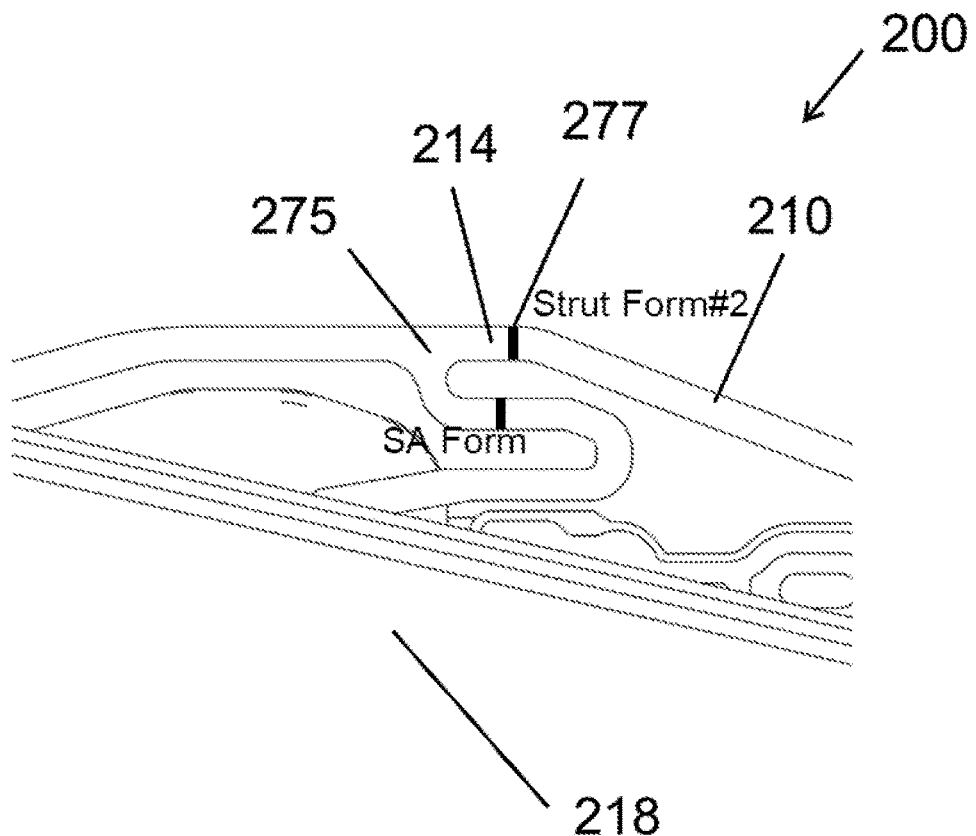
FIG. 2A illustrates an expanded view of a trace gimbal along the front outrigger of the outer gimbal struts according to some embodiments of the present disclosure.
Figure 2B:
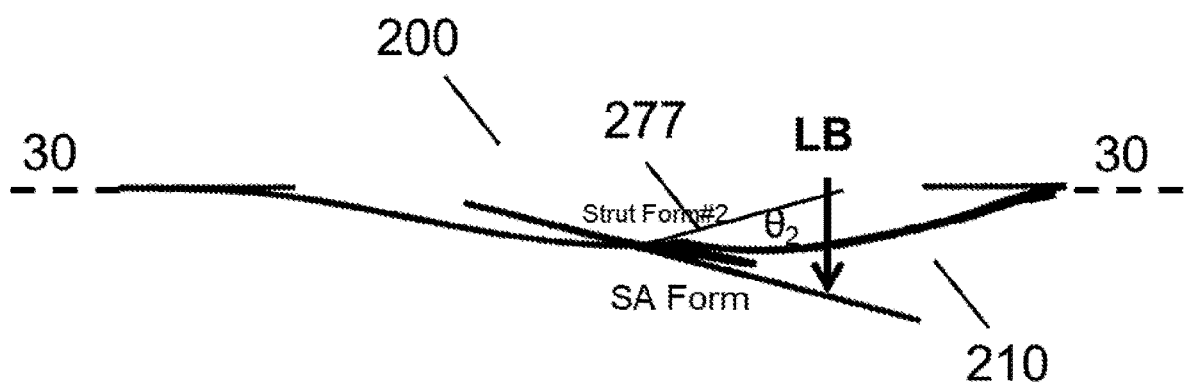
FIG. 2B illustrates a side profile of the trace gimbal along the front outrigger of the outer gimbal struts according to some embodiments of the present disclosure.

FIG. 2A illustrates an expanded view of a trace gimbal 200 along the front outrigger 210 of the outer gimbal struts according to some embodiments of the present disclosure. FIG. 2B illustrates a side profile of the trace gimbal 200 along the front outrigger 210 of the outer gimbal struts according to some embodiments of the present disclosure. In some embodiments, the trace gimbal 200 includes a strut form 277 disposed along the front outrigger 210 distal to a corner 275 and outside of a load beam 218 of the suspension. In some embodiments, the strut from 277 is positioned along the proximal front outrigger 214.

In some embodiments, the strut form 277 is bent away from the load beam 218 or a load beam reference plane 30-30 at a small angle $\theta_2$ (FIG. 2B) to increase dimple contact force more so than conventional trace gimbals. In some embodiments, the strut form 277 is bent towards the load beam at an angle $\theta_2$ from about 1.0 to 8.0 degrees. In some embodiments, the strut form 277 is bent towards the load beam at an angle $\theta_2$ from about 2.0 to 7.0 degrees. In some embodiments, the strut form 277 is bent towards the load beam at an angle $\theta_2$ from about 2.5 to 6.0 degrees, 2.5 to 5.5 degrees, 2.5 to 5.0 degrees, 2.5 to 4.5 degrees, 3.0 to 6.0 degrees, 3.0 to 5.5 degrees, 3.0 to 5.0 degrees, 3.0 to 4.5 degrees, or 3.0 to 4.0 degrees.

Figure 3A:
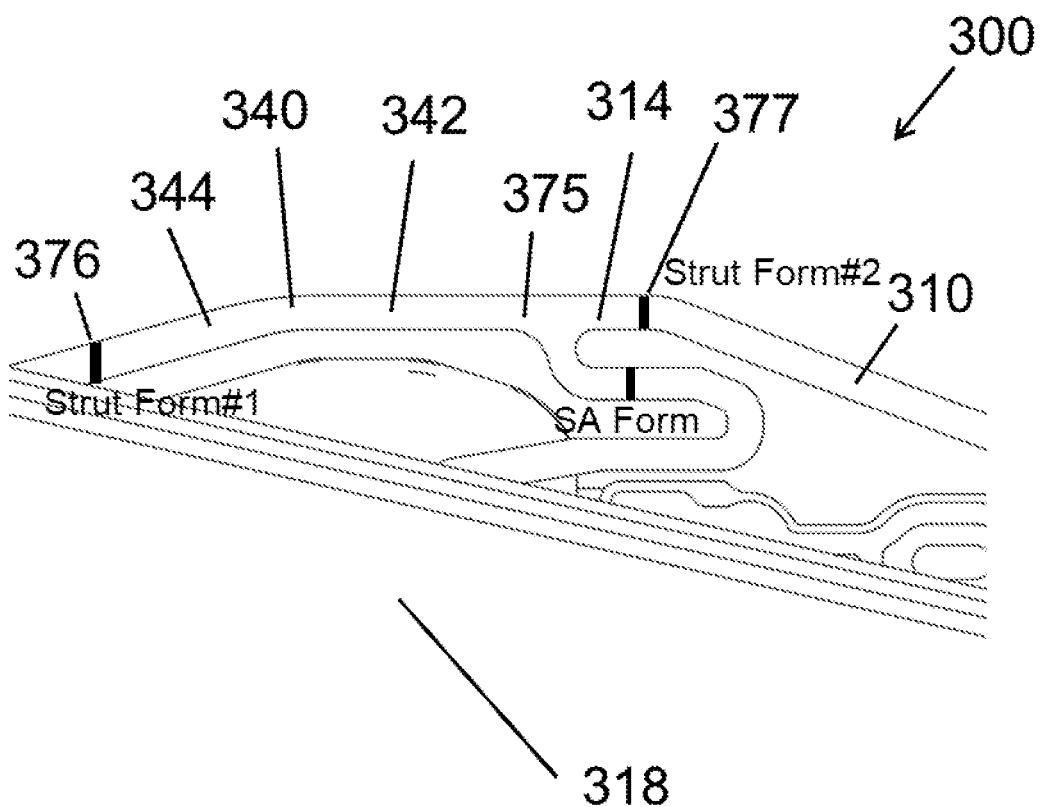
FIG. 3A illustrates an expanded view of another trace gimbal along the rear outrigger of the outer gimbal struts according to some embodiments of the present disclosure.
Figure 3B:
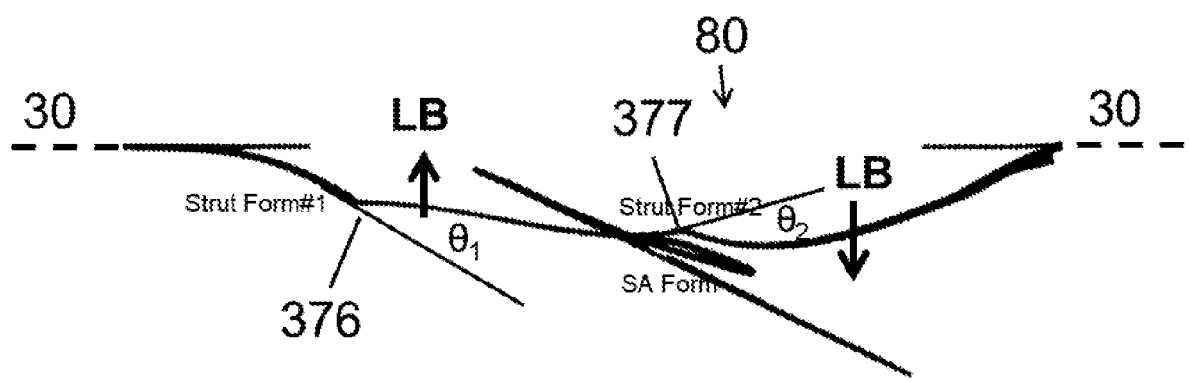
FIG. 3B illustrates a side profile of the trace gimbal along the rear outrigger of the outer gimbal struts according to some embodiments of the present disclosure.

FIG. 3A illustrates an expanded view of a trace gimbal 300 along the rear outrigger of the outer gimbal struts according to some embodiments of the present disclosure. FIG. 3B illustrates a side profile of the trace gimbal 300 along the rear outrigger 342 of the outer gimbal struts according to some embodiments of the present disclosure. In some embodiments, the trace gimbal 300 includes the strut form 377 disposed along the front outrigger 310 distal to the corner 375 and outside of the load beam 318 of the suspension, as well as the strut form 376 disposed along the rear outrigger 340 proximal to the corner 375. In some embodiments, the trace gimbal 300 includes the first strut form 376 disposed along the rear outrigger 340 proximal to the corner 375, as well as the second strut form 377 disposed along the front outrigger 310 distal to the corner 375 and outside of the load beam 318 of the suspension. In some embodiments, the trace gimbal 300 includes the first strut form 376 disposed along the proximal rear outrigger 344 proximal to the corner 375, as well as the second strut form 377 disposed along the proximal front outrigger 314 distal to the corner 375 and outside of the load beam 318 of the suspension.

In some embodiments, the combination of the first strut form 376 and the second strut form 377 enable the dimple contact force to be increased. In some embodiments, the first strut form 376 is bent towards the load beam 318 or a load beam reference plane 30-30 at a small angle $\theta_1$ (FIG. 3B), thereby increasing dimple contact force. In some embodiments, the strut form 376 is bent towards the load beam at an angle $\theta_1$ from about 1.0 to 8.0 degrees. In some embodiments, first strut form 376 is bent towards the load beam at an angle $\theta_1$ from about 2.0 to 7.0 degrees. In some embodiments, first strut form 376 is bent towards the load beam at an angle $\theta_1$ from about 2.5 to 6.0 degrees, 2.5 to 5.5 degrees, 2.5 to 5.0 degrees, 2.5 to 4.5 degrees, 3.0 to 6.0 degrees, 3.0 to 5.5 degrees, 3.0 to 5.0 degrees, 3.0 to 4.5 degrees, or 3.0 to 4.0 degrees.

In some embodiments, the second strut form 377 is bent away from the load beam 318 or a load beam reference plane 30-30 at a small angle $\theta_2$ (FIG. 3B), thereby increasing dimple contact force. In some embodiments, the strut form 377 is bent towards the load beam at an angle $\theta_2$ from about 1.0 to 8.0 degrees. In some embodiments, the strut form 377 is bent towards the load beam at an angle $\theta_2$ from about 2.0 to 7.0 degrees. In some embodiments, the strut form 377 is bent towards the load beam at an angle $\theta_2$ from about 2.5 to 6.0 degrees, 2.5 to 5.5 degrees, 2.5 to 5.0 degrees, 2.5 to 4.5 degrees, 3.0 to 6.0 degrees, 3.0 to 5.5 degrees, 3.0 to 5.0 degrees, 3.0 to 4.5 degrees, or 3.0 to 4.0 degrees.

In FIG. 3B, an exemplary position of the dimple 80 is shown. In some embodiments, the second strut form 377 bent away from the load beam 318 or a load beam reference plane 30-30 is aligned with the dimple 80 to improve dimple contact force.

FIG. 4 illustrates a comparison of the pitch static attitude (PSA), dimple contact force (DCF), first gimbal torsion mode (GT1) frequency, GT1 gain, and GT1 phase, for a gimbal having no strut forms, a gimbal having the first (#1) strut form, a gimbal having the second (#2) strut form, and a gimbal having the first (#1) and second (#2) strut forms. For exemplary purposes, the first strut form is bent toward a loam beam or a load beam reference plane at an angle of 3.26 degrees and the second strut form is bent away from the load beam or the load beam reference plane at an angle of 3.72 degrees.

PSA is the angle formed between the slider and the suspension in the direction parallel to the axis of symmetry of the suspension when no air bearing is formed. As shown in FIG. 4, the PSA angle in the gimbals according to some embodiments of the present disclosure (e.g., gimbal having the second strut form, and the gimbal having the first and second strut forms) can be approximately maintained compared to the baseline gimbal having the first strut form.

The gimbals according to some embodiments of the present disclosure demonstrate improved dimple contact force relative to the baseline gimbal having the first strut form and the gimbal having no strut forms. Without being bound to any particular theory, it is believed that the improved dimple contact force further stabilizes the dynamic performance during suspension load/unload and data seeking process. As shown in FIG. 4, the gimbals according to some embodiments of the present disclosure (e.g., gimbal having the second strut form, and the gimbal having the first and second strut forms) also demonstrate improved first gimbal torsion mode (GT1) frequency, GT1 gain, and GT1 phase compared to the baseline gimbal having the first strut form 76 and the gimbal having no strut forms.

A suspension including the trace gimbal according to some embodiments of the present disclosure is also described. The suspension includes a load beam, a base plate, and a trace gimbal, all of which are assembled together. The trace gimbal has a suspension tongue on which a slider is mounted. The suspension includes the baseplate as a proximal mounting structure. The trace gimbal includes the gimbal region according to some embodiments of the present disclosure at the distal end of the trace gimbal. A co-located or gimbal-based actuation structure is located on the gimbal, adjacent the distal end of the load beam.

The load beam can be formed from stainless steel. The load beam includes a dimple connecting the gimbal tongue with the load beam. The gimbal, in combination with the dimple of the load beam, enables the slider to pitch and roll in response to changes in airflow between the slider and the spinning disk of the hard disk drive that result from irregularities in the surface of the disk.

While multiple examples are disclosed, still other examples within the scope of the present disclosure will become apparent to those skilled in the art from the detailed description herein, which shows and describes illustrative examples. Accordingly, the drawings and the detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:

1. A trace gimbal comprising:
   outer struts including a front outrigger at a distal end of the trace gimbal and a rear outrigger at a proximal end of the trace gimbal, the front outrigger including a distal front outrigger and a proximal front outrigger, the rear outrigger including a distal rear outrigger and a proximal rear outrigger;
   a middle strut extending in a width direction of the trace gimbal, the middle strut adjoining the proximal front outrigger to the rear outrigger at a corner, and connecting to a slider tongue; and
   the front outrigger includes a strut form positioned along the proximal front outrigger and distal to the corner, the strut form bent away from a load beam reference plane at an angle $\theta$.

2. The trace gimbal of claim 1, wherein at least one microactuator is configured to be mounted on the slider tongue and the middle strut supports the slider tongue.

3. The trace gimbal of claim 1, wherein the strut form on the front outrigger is bent away from the load beam reference plane at the angle $\theta$ from about 1.0 to 8.0 degrees.

4. The trace gimbal of claim 1, wherein the strut form on the front outrigger is bent away from the load beam reference plane at the angle $\theta$ from about 2.0 to 7.0 degrees.

5. The trace gimbal of claim 1, wherein the outer struts include a second strut form disposed on the rear outrigger.

6. The trace gimbal of claim 5, wherein the second strut form is disposed on the proximal rear outrigger proximal to the corner of the middle strut and is bent toward the load beam reference plane at an angle $\theta$.

7. The trace gimbal of claim 6, wherein the second strut form is bent toward the load beam reference plane at the angle $\theta$ from about 1.0 to 8.0 degrees.

8. The trace gimbal of claim 6, wherein the second strut form is bent toward the load beam reference plane at the angle $\theta$ from about 2.0 to 7.0 degrees.

9. The trace gimbal of claim 1, wherein a first end of the middle strut adjoins the front outrigger and the rear outrigger, a second end of the middle strut connects the middle strut to the slider tongue, and the middle strut forms a U-shape between the first and second ends of the middle strut.

10. A suspension comprising:
    a trace gimbal including:
        outer struts including a front outrigger at a distal end of the trace gimbal and a rear outrigger at a proximal end of the trace gimbal, the front outrigger including a distal front outrigger and a proximal front outrigger, the rear outrigger including a distal rear outrigger and a proximal rear outrigger;
        a middle strut extending in a width direction of the trace gimbal, the middle strut adjoining the proximal front outrigger to the rear outrigger at a corner, and connecting to a slider tongue; and
        the front outrigger includes a strut form positioned along the proximal front outrigger and distal to the corner, the strut form bent away from a load beam reference plane at an angle $\theta$.

11. The suspension of claim 10, wherein at least one microactuator is configured to be mounted on the slider tongue, wherein the middle strut supports the slider tongue.

12. The suspension of claim 10, wherein the strut form on the front outrigger is bent away from the load beam reference plane at the angle $\theta$ from about 1.0 to 8.0 degrees.

13. The suspension of claim 10, wherein the strut form on the front outrigger is bent away from the load beam reference plane at the angle $\theta$ from about 2.0 to 7.0 degrees.

14. The suspension of claim 10, wherein the strut form is disposed on the proximal front outrigger.

15. The suspension of claim 10, wherein the outer struts include a second strut form disposed on the rear outrigger.

16. The suspension of claim 15, wherein the second strut form is disposed on the proximal rear outrigger.

17. The suspension of claim 15, wherein the second strut form is bent toward the load beam reference plane at an angle $\theta$ from about 1.0 to 8.0 degrees.

18. The suspension of claim 15, wherein the second strut form is bent toward the load beam reference plane at an angle $\theta$ from about 2.0 to 7.0 degrees.

19. The suspension of claim 10, wherein a first end of the middle strut adjoins the front outrigger and the rear outrigger, a second end of the middle strut connects the middle strut to the slider tongue, and the middle strut forms a U-shape between the first and second ends of the middle strut.

* * * * *